United States Patent [19]
Chung et al.

[11] Patent Number: 5,613,042
[45] Date of Patent: Mar. 18, 1997

[54] CHAOTIC RECURRENT NEURAL NETWORK AND LEARNING METHOD THEREFOR

[75] Inventors: Ho-sun Chung; Hye-young Tak, both of Taegu, Rep. of Korea

[73] Assignee: Gold Star Electron Co., Ltd., Cheongju, Rep. of Korea

[21] Appl. No.: 379,211

[22] Filed: Jan. 27, 1995

[30] Foreign Application Priority Data

Feb. 14, 1994 [KR] Rep. of Korea .................. 94-2540

[51] Int. Cl.$^6$ ........................... G06E 1/00; G06E 3/00
[52] U.S. Cl. ..................... 395/24; 395/21; 395/23
[58] Field of Search ..................... 395/21, 23, 24

[56] References Cited

U.S. PATENT DOCUMENTS

| | | | |
|---|---|---|---|
| 5,204,872 | 4/1993 | Staib et al. | 373/104 |
| 5,253,329 | 10/1993 | Villarreal et al. | 395/24 |
| 5,323,471 | 6/1994 | Hayashi | 382/15 |
| 5,408,424 | 4/1995 | Lo | 364/724.01 |

OTHER PUBLICATIONS

Kuo, J.M., "Prediction of chaotic time series using recurrent NN", NN for signal Processing II, 1992, pp. 436–443.

Principle, J.C., "Chaotic Dynamics of Time–delay NN", NN 1990 Int. Conf., pp. II–403 to II–409.

Davenport, M.R., "Chaotic Signal Emulation Using A recurrent time–delay NN," NN for Signal Processing II, 1992, pp. 254–463.

Roska, T., "Cellular NN With Nonlinear and time–delay template elements", 1990 Cellular NN and their Applications, pp. 12–25.

Roska, T. et al., "Stab. City and Dynamics of Delay–type General and Cellular NN," IEEE Trans. on CAS, V. 39, N. 6, 1992, pp. 487–490.

Li, L. et al, "A Careaded recurrent NN for real–time Nonlinear Adaptive Fellering," 1993 NN Int'l. cort., pp. 857–862.

*Primary Examiner*—Robert W. Downs
*Assistant Examiner*—A. Katbab
*Attorney, Agent, or Firm*—Rothwell, Figg, Ernst & Kurz

[57] ABSTRACT

A chaotic recurrent neural network includes N chaotic neural networks for receiving an external input and the outputs of N-1 chaotic neural networks among said N chaotic neural networks and performing an operation according to the following dynamic equation $$\gamma_i Y_i(t+1) = \sum_{j \in I \cup E} W_{ij} Z_i(t) + k Y_i(t) - \alpha X_i(t)$$
$$X_i(t) = f_i[Y_i(t)]$$

wherein $W_{ij}$ is a synapse connection coefficient of the feedback input from the "j"th neuron to the "i"th neuron, $X_i(t)$ is the output of the "i"th neuron at time t, and $\gamma_i$, $\alpha$ and and k are a time-delaying constant, a non-negative parameter and a refractory time attenuation constant, respectively, and wherein $Z_i(t)$ represents $X_i(t)$ when i belongs to the neuron group I and represents $a_i(t)$ when i belongs to the external input group E. Also, a learning algorithm for the chaotic recurrent neural network increases its learning efficiency.

4 Claims, 2 Drawing Sheets

CHAOTIC RECURRENT NEURAL NETWORK AND LEARNING METHOD THEREFOR

BACKGROUND OF THE INVENTION

The present invention relates to neural networks, and more particularly, to a chaotic recurrent neural network and a learning algorithm therefor.

Recently, various research efforts into neural networks have been actively progressed. These efforts include studies of a neural network model having a recurrent connection where time-variant input and output signals can be processed. Also, a back-propagation through time (BPTT) algorithm is widely used to convert the recurrent neural network into a multilayer feed-forward network for learning, and is so named (back-propagation) due to the reversed learning process employed. Here, a discrete-time model of the recurrent neural network is spatially unfolded to realize the multilayer feed-forward network.

In the above BPTT algorithm, the number of calculations equals the square of the cell number. An updated trajectory value has to be temporarily stored as the dynamics of a network are calculated over time (from time "O" to time "T") and then the error has to be reversely calculated (from time "T" to time "O"). As the learning algorithm of a recurrent neural network which overcomes the above drawbacks in calculation, a finite time learning algorithm, where the neural network is operated after a connecting weight is fixed during a predetermined time period, thereby reducing most of the system error in a given time period, has been suggested. The recurrent neural network is classified according to whether the connecting weight is regarded as a time-variant function or a time-invariant value which is constant during a predetermined time period of the network operations. Here, the finite time learning algorithm is the latter (time-variant) value for minimizing error after termination of the time period.

A neural network is composed of N neurons satisfying the following dynamic equations.

$$\gamma_i \dot{Y}_i(t) = -Y_i(t) + \sum_j W_{ij} X_j(t) + a_i(t) \tag{1}$$

$$X_i(t) = f_i[Y_i(t)] \tag{2}$$

Here, i is a natural number from one to N; $Y_i(t)$ is the output of the "i"th neuron; $f_i$ is the output function of a neuron; $\gamma_i$ is a time delay constant; and $W_{ij}$ is a connecting weight of the "j"th neuron, which is a time-invariant value. Also, the network has a bias signal a(t) externally provided at time t, as a time-variant function.

FIG. 1 shows the conventional recurrent neural network model.

In this case, the network operates for a given time period according to a predetermined initial condition and an external input. During network operation, the connecting weight between neurons is fixed and the error is accumulated over time. The learning function of a network is defined as the total error of the network and is calculated during a predetermined time period as follows.

$$E(W) = \int_{T1}^{T2} \sum_{i \in V} \frac{1}{2} [X_i(t|W) - Q_i(t)]^2 \tag{3}$$

Here, $X_i(t|W)$ is the output of the "i"th neuron of a network at time t, for a fixed connecting weight matrix W which is calculated from equations (1) and (2); and $Q_i(t)$ is a given time-variant teacher signal. In this case, a steepest descent method is used as a weight correction rule and the connecting weight correction amount calculated by introducing a Lagrange multiplier $L_i(t)$ is as follows.

$$\begin{aligned} \Delta W_{ij} &= -\eta \left( \frac{\partial E(W)}{\partial W_{ij}} \right) \\ &= -\eta \int_{T1}^{T2} dt L_i(t|W) Y_j(t|W) \end{aligned} \tag{4}$$

Here, $\eta$ is a positive constant.

This method has been adopted for handwritten numeral recognition so that time sequential data can be recognized and estimated.

The research into neural computers for imitating the structure of a cerebral neural network and the information processing mechanism thereof began with a mathematical neural model based on the digital characteristics of an active potential pulse. However, recently, interest in the analog characteristics of a neuron has gradually increased. That is, the extraordinarily dynamic behavior of a cerebral nervous system exhibits a response characteristic called "chaos" which cannot be described by the conventional neuron model. Therefore, in a recently suggested chaos neuron model, the non-linear analog characteristics of the brain are emphasized. This model performs an analog correction of the response characteristic so that the qualitative description of a chaos response characteristic is possible.

The chaos neuron model with respect to one input is expressed as:

$$X(t+1) = f\left[ A(t) - \alpha \sum_{r=0}^{t} K^r g X(t-r) - \theta \right] \tag{5}$$

where X(t) is the output of a neuron at time t and corresponds to the peak value of a neural pulse ($0 \leq X(t) \leq 1$), f is an output function of the neuron, A(t) is the magnitude of an input stimulus at time t, $\alpha$ is a non-negative parameter ($\alpha \geq 0$), k is a refractory time attenuation constant ($0 \leq k \leq 1$), g is a function showing the relation between the output of a neuron and the refractory in response to the next stimulus (hereinafter, supposing that identical function g(x) equals x, for simplification), and e is a threshold value.

Supposing a time-spacial summation, where a previous value is added to the current value and attenuated over time (here, attenuation constant is k), as the same with the refractory, the input and output characteristics of a neuron can be expressed by the following equation (6).

$$X_i(t+1) = f\left[ \sum_{j=0}^{M} V_{ij} \sum_{r=0}^{t} k^r A_j(t-r) + \right.$$

$$\left. \sum_{j=1}^{N} W_{ij} \sum_{r=0}^{t} k^r h[X_j(t-r)] - \alpha \sum_{r=0}^{t} k^r X_i(t-r) - \theta_i \right] \tag{6}$$

Here, $X_i(t+1)$ is the output of the "i"th neuron at time t+1; $V_{ij}$ is a synapse connection coefficient from the "j"th external input to the "i"th neuron; $A_j(t)$ is the magnitude of the "j"th external input at time t, $W_{ij}$ is a synapse connection coefficient of the feedback input from the "j"th neuron to the "i"th neuron; and $\theta$ is the threshold of the "i"th neuron.

Here, the discrete-time dynamics of a chaotic neuron are expressed by the following simple differential equation.

$$Y_i(t+1) = kY_i(t) + \sum_{j=1}^{N} W_{ij} h[f(Y_i(t))] - \alpha f[Y_i(t)] + a_i(t) \tag{7}$$

$$X_i(t+1) = f[Y_i(t+1)] \tag{8}$$

$$a_i(t) = \sum_{j=1}^{M} V_{ij}A_j(t) - \theta_i(1-k) \quad (9)$$

The neural network expressed as equations (7), (8) and (9) is called a chaotic neural network. When the chaotic neural network is applied to an associative memory model, the network is not stably converged to one memory pattern which is the closest to a current input and dynamically oscillates over various memory patterns according to the values of the parameters.

After the chaotic neural network model was suggested, the analysis of a constant input regardless of time is proceeded, by applying the model to an operation memory device. However, so far, there has been nothing reported on a chaotic neural network employing a time-variant input and output. In order to observe the possibility for the learning of a chaotic neural network using this time-variant input and output and the application thereof, the chaotic recurrent neural network is composed of chaotic neurons and a finite time learning algorithm improved by properly correcting the finite time learning algorithm for general recurrent neural network is suggested. Also, the effects of the refractory parameters of chaotic neural network in the learning of the chaotic recurrent neural network according to this method will be analyzed.

However, since the suggested finite time learning algorithm is a kind of reversed recurrent neural network, the same problems as those shown in the multi-neutral network using the reversed method are generated when the method is applied. The problems are local minima and a long learning time.

FIG. 2 is a graph showing total error with respect to learning iteration of the recurrent neural network shown in FIG. 1. Here, it can be seen that as the number of iterations increases, the accumulative error is not largely corrected and its slope is relatively steep as it approaches the teacher signal. To overcome this problem, the present invention adopts a chaotic neural network. The chaotic neural network is induced from a discrete-time neuron model. The chaotic neural network exhibits both a periodical response (which cannot be realized by the conventional neuron model) and a chaotic response.

SUMMARY OF THE INVENTION

It is an object of the present invention to provide a chaotic recurrent neural network in which a chaotic neuron is adopted for the neuron of a conventional recurrent neural network.

It is another object of the present invention to provide a learning algorithm for the chaotic recurrent network in which learning time is reduced and learning ability is improved.

To achieve the above first object of the present invention, there is provided a chaotic recurrent neural network comprising N neurons for receiving an external input and the outputs of N-1 neurons among the N neurons and performing an operation according to the following dynamic equation $$\gamma_i Y_i(t+1) = \sum_{j \in I \cup E} W_{ij}Z_i(t) + kY_i(t) - \alpha X_i(t)$$
$$X_i(t) = f_i[Y_i(t)]$$

wherein $W_{ij}$ is a synapse connection coefficient of the feedback input from the "j"th neuron to the "i"th neuron, $X_i(t)$ is the output of the "i"th neuron at time t, and $\gamma_i$, $\alpha$ and k are a time-delaying constant, a non-negative parameter and a refractory time attenuation constant, respectively, and wherein $Z_i(t)$ represents $X_i(t)$ when i belongs to the neuron group I and represents $a_i(t)$ when i belongs to the external input group E.

To achieve the above second object to the present invention, there is provided a learning algorithm for the chaotic recurrent neural network according to the present invention comprising the steps of: (a) initializing an initial condition X(O) and connection weights using a random value; (b) operating the neurons for a time period "T" according to the dynamic equation where the given initial condition is $X_i(O)$ and external input is $a_i(t)$; (c) reversely calculating a Lagrange multiplier at boundary condition $L_i(T|W)=0$ and given teacher signal $Q_i(t)=0$ from time t, according to the following equation $$L_i(t-1) = \sum_{j \in I} L_j(t)W_{ji}f'[Y_i(t)] + [X_i(t) - Q_i(t)]f'[Y_i(t)] +$$

$$kL_i(t) - \alpha L_i(t)f'[Y_i(t)]$$

wherein $X_i(t)$ is the value calculated in the step (b); and (d) summing total errors after the steps (b) and (c) are completed for all inputs, and terminating the learning if the error is below a predetermined limit and otherwise correcting the weight according to the following weight correction equation $$\Delta W_{ij} = - \sum_{t=0}^{T} L_i(t)Z_j(t)$$

and repeating the steps (b) to (d).

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 3:
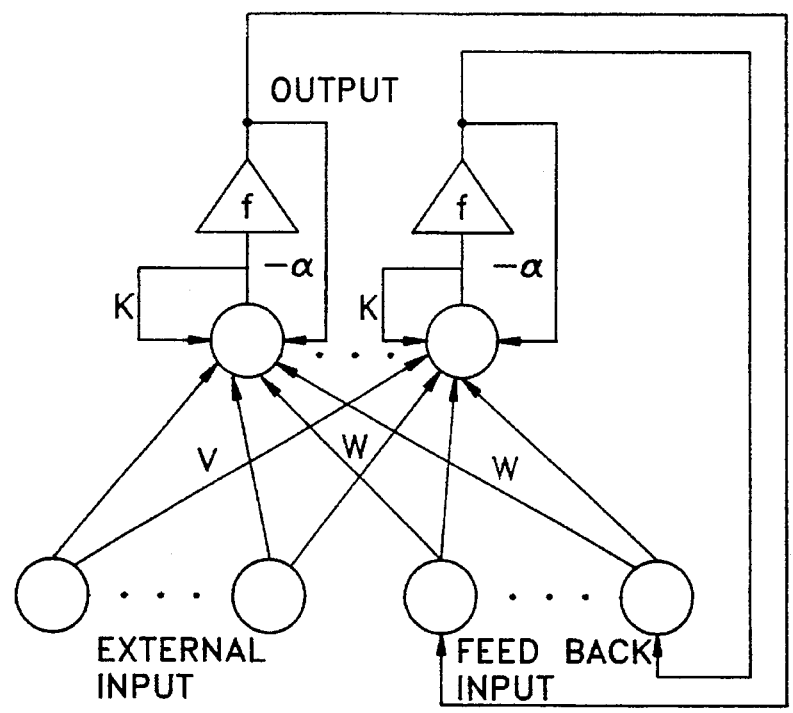
FIG. 3 is a model of a chaotic recurrent neural network according to the present invention.

The chaotic recurrent neural network, shown in FIG. 3, according to the present invention is composed of N neurons satisfying the following dynamic equations.

$$\gamma_i \dot{Y}_i(t) = -Y_i(t) + \sum_{j \in I \cup E} W_{ij}Z_j(t) + kY_i(t) - \alpha X_i(t) \quad (10)$$

$$X_i(t) = f_i[Y_i(t)] \quad (11)$$

This network is composed of n output signals represented as Y(t) and m external input signals a(t), which input to the neurons at time t.

According to the present invention, the above two signals are combined and expressed as a symbol of Z(t). When the subscript "i" belongs to the group I of neurons comprising the network, $Z_i$ represents the output of the network, and when the subscript "i" belongs to the group E comprising an external input to the network, $Z_i$ represents the external input.

That is, $$Z_i(t) = \begin{bmatrix} X_i(t) & \text{if } i \in I \\ a_i(t) & \text{if } i \in E \end{bmatrix} \quad (12)$$

Figure 1:
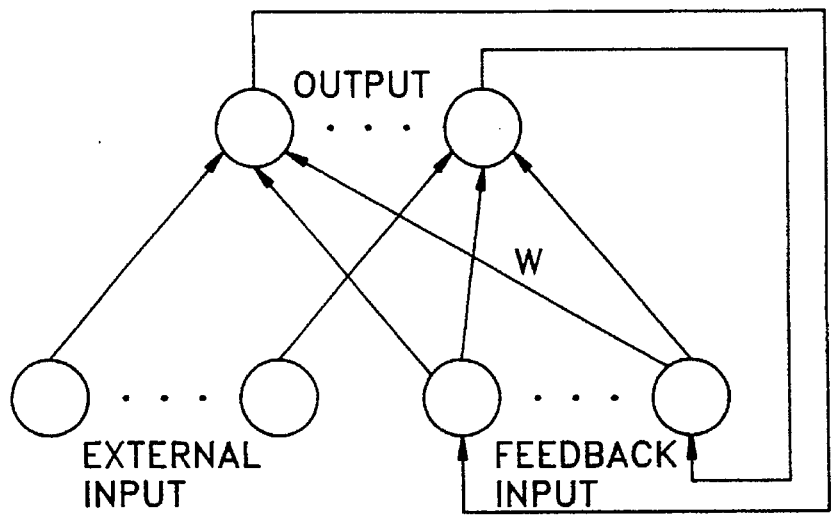
FIG. 1 shows a model of a conventional recurrent neural network.

In the present embodiment, the network operates for a given time period according to a predetermined initial condition and an external input, during which the connecting weight between neurons is fixed and the error is accumulated over time, as in the case of the conventional recurrent neural network model of FIG. 1. Also, the learning function of the network is defined as the network's total error calculated by $$E(W(v)) = \int_{T1}^{T2} \sum_{i \in I} \frac{1}{2} [X_i(t|W) - Q_i(t)]^2 \quad (13)$$

wherein $X_i(t|W)$ represents the output of the "i"th neuron of the network at time t, and $Q_i(t)$ represents the given time-variant teacher signal. The above steepest descent method is used as the weight correcting rule, and the correction amount of a connecting weight is calculated by $$\Delta W_{ij} = -\eta \left( \frac{\partial E(W)}{\partial W_{ij}} \right) \quad (14)$$

wherein $\eta$ is a positive constant. For calculating equation (14), assuming equation (15) represents the change of a learning error according to the change of a weight as $$\delta E(W) = E(W+\delta W) - E(W) \ldots \quad (15)$$

since $X_i(t)$ and $Y_i(t)$ satisfies the dynamic equations (10) and (11), learning error E(W) can be expressed by the following equation.

$$E(W) = \int_{T1}^{T2} \frac{1}{2} \sum_{i} \sum_{I} [X_i(t|W) - Q_i(t)]^2 - \\ \sum_{i} \sum_{I} L_i(t|W) \left[ (\gamma_i \dot{Y}_i(t|W) + (1-k)Y_i(t|W) - \sum_{j \cup E} W_{ij} Z_j(t|W) + \alpha X_i(t|W) \right] \quad (16)$$

If Lagrange multiplier $L_i(t)$ satisfying equation (17) is introduced, the changed amount of the learning error is expressed as equation (18).

$$\gamma_i \dot{L}_i(t) = (1-k)L_i(t|W) - \sum_{j=1}^{N} L_j W_{ij} f'[Y_i(t|W)] - \\ \delta_i k(X_i - Q_i) f'[Y_i(t|W)] + L_i(t|W) \alpha f'[Y_i(t|W)] \quad (17)$$

$$\delta E(W) = \sum_{i=1}^{N} L_i(T1|W)\gamma_i \delta Y_i(T1|W) - \\ \sum_{i=1}^{N} L_i(T2|W)\gamma_i \delta Y_i(T2|W) + \int_{T1}^{T2} dt \sum_{i,j} L_i(t|W) Z_j(t|W) \delta W_{ij} \quad (18)$$

The first term is eliminated from equation (18) by the following equation (19) of the fixed initial condition. Also, if Lagrange multiplier $L_i(t)$ satisfies a boundary condition of the following equation (20), the second term is eliminated. That is, $$\delta Y_i(T1|W) = 0 \ldots \quad (19)$$

$$L_i(T2|W) = 0 \ldots \quad (20)$$

Ultimately, the connecting weight correction method is represented as the following equation.

$$\Delta W_{ij} = -\eta \int_{T1}^{T2} dt L_i(t|W) Z_j(t|W) \quad (21)$$

The overall learning algorithm is as follows.

In a first step, initial condition $X_i(0)$ and the connecting weight are initialized as a random value.

Then, in a second step, the network operates for a time period "T" at the given initial condition $X_i(0)$ and external input $a_i(t)$, according to the following dynamic equation.

$$Y_i(t+1) = \sum_{j \in I \cup E} W_{ij} Z_i(t) + kY_i(t) - \alpha X_i(t) \quad (22)$$

$$X_i(t) = f_i[Y_i(t)]$$

In a third step, Lagrange multiplier $L_i$ is reversely obtained from time t by boundary condition equation (20) and given teacher signal $Q_1(t)$ according to equation (18). Here, $X_i(t)$ is a value calculated in the second step.

$$L_i(t-1) = \sum_{j} \sum_{I} L_j(t) W_{ij} f'[Y_i(t)] + \\ [X_i(t) - Q_i(t)] f'[Y_i(t)] + kL_i(t) - \alpha L_i(t) f'[Y_i(t)] \quad (23)$$

In a fourth step, the sum of the total error is calculated after the processes from the second and third steps are performed to all inputs. If the error is below a constant limit, the learning is completed. Otherwise, after the weight is corrected according to the following weight correction equation, the processes are repeated from the second step.

$$\Delta W_{ij} = - \sum_{t=0}^{T} L_i(t) Z_j(t) \quad (24)$$

Figure 2:
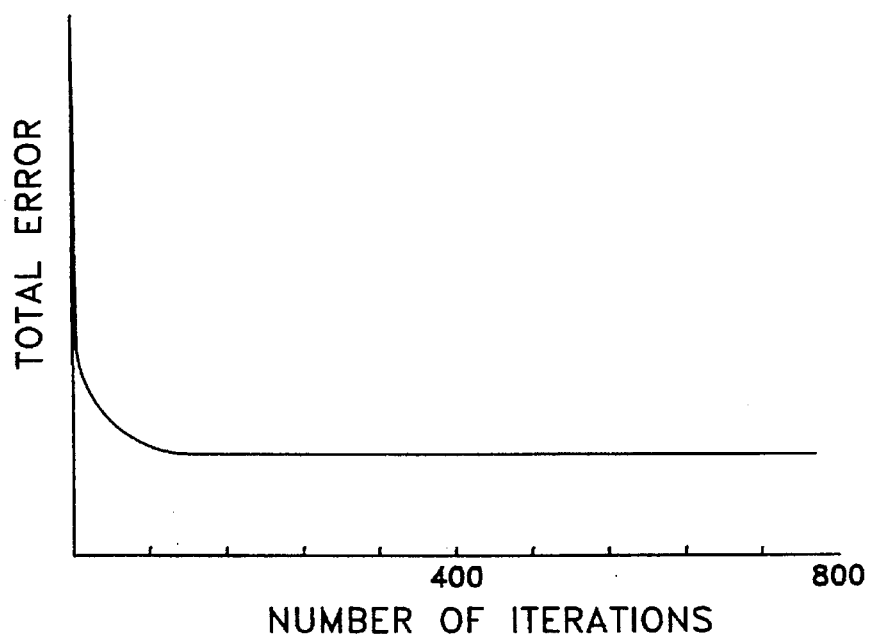
FIG. 2 is a graph showing an accumulative error with respect to the learning iterations of the recurrent neural network shown in FIG. 1.
Figure 4:
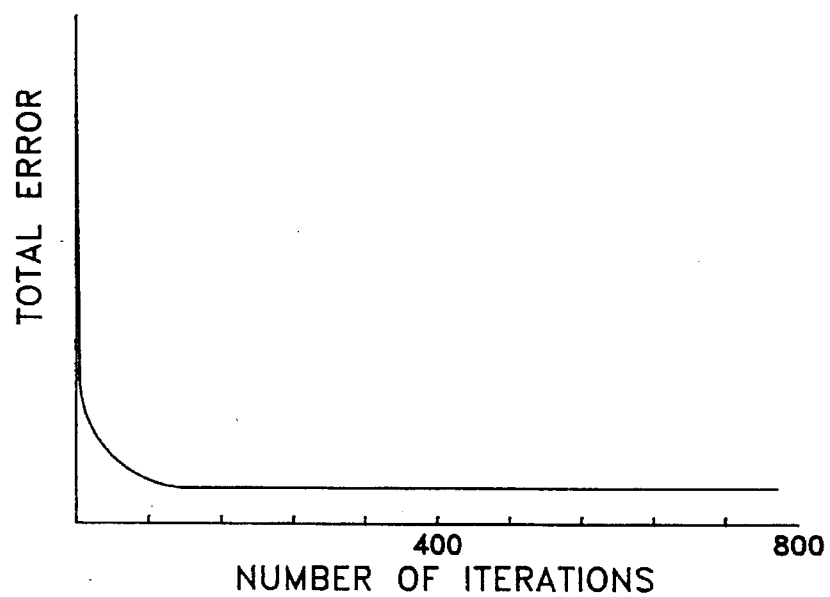
FIG. 4 is a graph showing the accumulative error with respect to the learning iterations of the recurrent neural network in the case where the learning algorithm according to the present invention is applied to the model of FIG. 3.

FIG. 4 is a graph showing the accumulated error with respect to the number of learning iterations of the recurrent neural network in the case where the learning algorithm according to the present invention is applied to the network of FIG. 3. Here, it can be seen that the ultimate error value is greatly decreased from that shown in FIG. 2, even though the learning iteration does not increase much. In the graph of FIG. 4, k is 0.9 and $\alpha$ is 0.4.

Therefore, the learning algorithm of the chaotic recurrent neural network according to the present invention can provide good results in a shorter learning time than that required in the recurrent neural network.

What is claimed is:

1. A chaotic recurrent neural network comprising:

N neurons configured to receive an external input and the outputs of selected ones of said N neurons and performing an operation according to the following dynamic equations $$\gamma_i Y_i(t+1) = \sum_{j \in I \cup E} W_{ij} Z_i(t) + kY_i(t) - \alpha X_i(t)$$

$$X_i(t) = f_i[Y_i(t)]$$

wherein $W_{ij}$ is a synapse connection coefficient of the feedback input from the "j"th neuron to the "i"th neuron, $X_i(t)$ is the output of the "i"th neuron at time t, and $\gamma_i$, $\alpha$ and k are a time-delaying constant, a non-negative parameter and a refractory time attenuation constant, respectively, and wherein $Z_i(t)$ represents $X_i(t)$ when i belongs to the neuron group I and represents $a_i(t)$ when i belongs to the external input group E.

2. A learning method for a chaotic recurrent neural network comprising N neurons for receiving an external input and the outputs of selected ones of said N chaotic neurons and performing an operation according to the following dynamic equation $$\gamma_i Y_i(t+1) = \sum_{j \in I \cup E} W_{ij} Z_i(t) + k Y_i(t) - \alpha X_i(t)$$

$$X_i(t) = f_i[Y_i(t)]$$

wherein $W_{ij}$ is a synapse connection coefficient of the feedback input from the "j"th neuron to the "i"th neuron, $X_i(t)$ is the output of the "i"th neuron at time t, and $\gamma_i$, $\alpha$ and k are a time-delaying constant, a non-negative parameter and a refractory time attenuation constant, respectively, and wherein $Z_i(t)$ represents $X_i(t)$ when i belongs to the neuron group I and represents $a_i(t)$ when i belongs to the external input group E, said method comprising the steps of:

(a) initializing an initial condition $X_i(O)$ and connection weights using a random value;

(b) operating the neurons for a time period "T" according to the dynamic equation where the initial condition is $X_i(O)$ and the external input is $a_i(t)$;

(c) reversely calculating a Lagrange multiplier for a boundary condition $L_i(T/W)=0$ and a teacher signal $Q_i(t)=0$ from time t, according to the following equation $$L_i(t-1) = \sum_{j \in I} L_j(t) W_{ji} f'[Y_i(t)] +$$

$$[X_i(t) - Q_i(t)] f'[Y_i(t)] + k L_i(t) - \alpha L_i(t) f'[Y_i(t)]$$

wherein $X_i(t)$ is the value calculated in said step (b); and (d) summing total errors after said steps (b) and (c) are completed for all inputs, and terminating the learning if the error is below a predetermined limit and otherwise correcting the weight according to the following weight correction equation $$\Delta W_{ij} = - \sum_{t=0}^{T} L_i(t) Z_j(t)$$

and repeating said steps (b) to (d).

3. The chaotic recurrent neural network of claim 1 wherein said selected ones of said neurons includes N-1 of said neurons.

4. A chaotic recurrent neural network comprising

N neuron means, each of said neuron means configured to satisfy the dynamic equations $$\gamma_i \dot{Y}_i(t) = -Y_i(t) + \sum_j W_{ij} X_j(t) + a_i(t) \quad (1)$$

$$X_i(t) = f_i[Y_i(t)] \quad (2)$$

where, i is a natural number from one to N, $Y_i(t)$ is the output of the "i"th neuron, $f_i$ is the output function of a neuron, $\gamma_i$ is a time delay constant, $W_{ij}$ is a connecting weight of the "j"th neuron, which is a time-invariant value and a(t) is the network bias signal which is externally provided at time t, as a time-variant function;

said N neuron means configured to receive an external input and the outputs of selected ones of said N neuron means and for performing an operation according to the following dynamic equations $$\gamma_i Y_i(t+1) = \sum_{j \in I \cup E} W_{ij} Z_i(t) + k Y_i(t) - \alpha X_i(t)$$

$$X_i(t) = f_i[Y_i(t)]$$

wherein $W_{ij}$ is a synapse connection coefficient of the feedback input from the "j"th neuron to the "i"th neuron, $X_i(t)$ is the output of the "i"th neuron at time t, and $\gamma_i$, $\alpha$ and k are a time-delaying constant, a non-negative parameter and a refractory time attenuation constant, respectively, and wherein $Z_i(t)$ represents $X_i(t)$ when i belongs to the neuron group I and represents $a_i(t)$ when i belongs to the external input group E.

* * * * *